United States Patent
Bayer et al.

(10) Patent No.: US 11,767,439 B2
(45) Date of Patent: Sep. 26, 2023

(54) ELECTRICALLY CONDUCTIVE CELLULOSE-BASED COMPOSITE MATERIAL

(71) Applicant: FONDAZIONE ISTITUTO ITALIANO DI TECNOLOGIA, Genoa (IT)

(72) Inventors: Ilker S. Bayer, Genoa (IT); Pietro Cataldi, Genoa (IT); Athanasia Athanasiou, Ceranesi (IT)

(73) Assignee: Fondazione Istituto Italiano di Tecnologia, Genoa (IT)

( * ) Notice: Subject to any disclaimer, the term of this patent is extended or adjusted under 35 U.S.C. 154(b) by 351 days.

(21) Appl. No.: 17/262,669

(22) PCT Filed: Jul. 19, 2019

(86) PCT No.: PCT/IB2019/056193
§ 371 (c)(1),
(2) Date: Jan. 22, 2021

(87) PCT Pub. No.: WO2020/021413
PCT Pub. Date: Jan. 30, 2020

(65) Prior Publication Data
US 2021/0309872 A1  Oct. 7, 2021

(30) Foreign Application Priority Data
Jul. 23, 2018  (IT) .......................... 102018000007450

(51) Int. Cl.
*C09D 11/04* (2006.01)
*C09D 11/08* (2006.01)
(Continued)

(52) U.S. Cl.
CPC .............. *C09D 11/04* (2013.01); *C09D 11/08* (2013.01); *C09D 11/14* (2013.01); *C09D 11/52* (2013.01);
(Continued)

(58) Field of Classification Search
CPC ......... C09D 11/04; C09D 11/08; C09D 11/14; C09D 11/52; D21H 17/22; D21H 17/63;
(Continued)

(56) References Cited

U.S. PATENT DOCUMENTS

2013/0131222 A1\*  5/2013  Gross ..................... C08G 18/36
528/80

FOREIGN PATENT DOCUMENTS

| CN | 103448308 | 12/2013 |
| WO | 2006/120227 | 11/2006 |

OTHER PUBLICATIONS

International Search Report and Written Opinion of the ISA for PCT/IB2019/056193, dated Nov. 19, 2019, 13 pages.
(Continued)

*Primary Examiner* — Tri V Nguyen
(74) *Attorney, Agent, or Firm* — Nixon & Vanderhye P.C.

(57) ABSTRACT

Cellulose-based composite material comprising an electrically conductive material dispersed in a matrix comprising at least one plant-derived protein and a polymer of aleuritic acid, said composite material being obtainable by a process comprising the steps of dissolving at least one plant-derived protein and aleuritic acid in a dissolving solution to achieve a first mixture, dispersing an electrically conductive material in said first mixture to achieve a conductive ink, distributing said conductive ink on at least one side of a cellulose substrate to achieve a coated cellulose substrate, hot-pressing said coated cellulose substrate to obtain i) impregnation
(Continued)

of the cellulose substrate with said conductive ink and ii) polymerization of aleuritic acid.

25 Claims, 7 Drawing Sheets

(51) Int. Cl.
    *C09D 11/14*     (2006.01)
    *C09D 11/52*     (2014.01)
    *D21H 19/38*     (2006.01)
    *D21H 19/50*     (2006.01)
    *D21H 19/62*     (2006.01)
    *D21H 25/06*     (2006.01)
    *H01B 1/24*     (2006.01)

(52) U.S. Cl.
    CPC ............ *D21H 19/38* (2013.01); *D21H 19/50* (2013.01); *D21H 19/62* (2013.01); *D21H 25/06* (2013.01); *H01B 1/24* (2013.01)

(58) Field of Classification Search
    CPC ........ D21H 19/32; D21H 19/50; D21H 19/62; D21H 25/06; H01B 1/24
    USPC .................................. 252/500–518; 428/220
    See application file for complete search history.

(56) References Cited

OTHER PUBLICATIONS

Cataldi et al., "Foldable Conductive Cellulose Fiber Networks Modified by Graphene Nanoplatelet-Bio-Based Composites", Advanced Electronic Materials, vol. 1, No. 12, 8 pages, XP055347959.
Heredia-Guerrero et al., "All-Natural Sustainable Packaging Materials Inspired by Plant Cuticles", Advanced Sustainable Systems, vol. 1, No. 1-2, 9 pages, XP055567028.
Heredia-Guerrero et al., "Cellulose-polyhydroxylated fatty acid ester-based bioplastics with tuning properties: Acylation via a mixed anhydride system", Carbohydrate Polymers, vol. 173, 9 pages, XP085134534.
Pattammattel et al., "Kitchen Chemistry 101: Multigram Production of High Quality Biographene in a Blender with Edible Proteins", Advanced Functional Materials, vol. 25, No. 45, pp. 11 pages, XP055566999.
Wang et al., "Multifunctional graphene nanoplatelets/cellulose nanocrystals composite paper", Composites: Part B, vol. 79, 9 pages, XP055348167.
Kiziltas et al., "Electrically conductive nano graphite-filled bacterial cellulose composites", Carbohydrate Polymers, vol. 136, 8 pages, XP055347952.

\* cited by examiner

ELECTRICALLY CONDUCTIVE CELLULOSE-BASED COMPOSITE MATERIAL

This application is the U.S. national phase of International Application No. PCT/IB2019/056193 filed 19 Jul. 2019, which designated the U.S. and claims priority to IT Patent Application No. 102018000007450 filed 23 Jul. 2018, the entire contents of each of which are hereby incorporated by reference.

FIELD OF THE INVENTION

This disclosure relates to electrically conductive cellulose-based composite materials. One or more embodiments may regard, for example, biodegradable flexible cellulose-based composite materials suitable to be employed in electronic devices.

BACKGROUND OF THE INVENTION

Electronic technologies are widespread in many aspects of human-life. The fast obsolescence of existing electrical goods and the design of new devices with augmented performances, increase drastically the electrical apparatus sales. This extraordinary innovation speed produces important social and industrial problems when old electronic devices need to be discarded. Indeed, 50 million tons of electronic wastes (e-waste) are forecasted to be produced in 2018. Electrical components, that are non-biodegradable, have environmentally hazardous substances such as heavy metals, brominated flame retardants and polyhalogenated molecules that can be released in the environment. Therefore, the proper management of e-waste has to be regulated by law in most of developed countries and the innovation in the design and materials for electronics has to pursue sustainability.

New application for electronic devices, such as wearable electronics and Internet of Things, are expected to increase the use of electronics, and consequently of their waste. These new applications will also require new properties like flexibility, conformability and safe disposal. The continuous growth in energy demand has given rise to a need of flexible and compliant electronic materials to render such technologies self-powered by generation or harvesting of electrical power. Most electronic components are made with inorganic bulk, rigid, long-lasting and, sometimes, rare materials. On the other hand, many organic materials abundant in nature have shown to be biodegradable, flexible, biocompatible, lightweight, and low-cost. Consequently, the use of these "green" components to manufacture sustainable and flexible electronics spurred the growth of research in order to meet the rigorous requirements of portable electronics while greatly facilitating e-waste management. Under such perspective, plant materials show the chemical and structural advantages required to meet the needs of the growing electronic market. This renders the functionalization of plant-based components with conductive nanomaterials a viable way to induce electrical conductivity to such materials. This approach has been partially employed elsewhere with the modification of plant-derived cellulose by addition of conductive nanoparticles. In any case, this functionalization has been often carried out with metal-based and/or inorganic materials and without the employment of a binder which prevents adhesion problems for both inorganic and not plant-derived system.

Indeed, the proper interaction between the conductive nanomaterial and the cellulose fibers, ensure mechanical resistance and durability. In this sense, a plant-based nanocomposite functionalized with conductive nanoparticles could constitute a smart method to exploit the advantage of organics materials and to build sustainable and flexible devices. In fact, plants are natural and biodegradable and present outstanding mechanical properties (e.g. flexibility and lightweight). For the first time, such an approach can be named "Plant-e-tronics", this is, plant-based sustainable flexible electronics.

The scientific publication Cataldi et al., "Foldable Conductive Cellulose Fiber Network Modified by Graphene Nanoplatelet-Bio-Based Composites" Advanced Electronic Materials (2015), 1, 1500224:1-8, discloses a method for producing a foldable composite comprising a biodegradable plant-derived matrix.

Improved technical solutions, however, are still needed in order to provide flexible and stable conductive biodegradable composite materials.

SUMMARY OF THE INVENTION

The object of this disclosure is to provide a versatile, flexible, robust, low cost and easily disposable biodegradable cellulose-based composite material impregnated with a conductive ink comprising an electrically conductive material suitable to be employed in different applications, from EMI shielding to antennas, photovoltaics cells and finally to foldable and wearable electronics.

The above object is achieved thanks to the subject matter recalled specifically in the ensuing claims, which are understood as forming an integral part of this disclosure.

The present disclosure provides a cellulose-based composite material comprising an electrically conductive material dispersed in a matrix comprising at least one plant-derived protein and a polymer of aleuritic acid, said cellulose-based composite material being obtainable by a process comprising the steps of:
  dissolving at least one plant-derived protein and aleuritic acid in a dissolving solution to achieve a first mixture,
  dispersing an electrically conductive material in said first mixture to achieve a conductive ink,
  distributing said conductive ink on at least one side of a cellulose substrate to achieve a coated cellulose substrate,
  hot-pressing said coated cellulose substrate to obtain i) impregnation of the cellulose substrate with said conductive ink and ii) polymerization of aleuritic acid.

The cellulose-based composite material so achieved is therefore impregnated with the conductive ink comprising an electrically conductive material dispersed in a matrix comprising at least one plant-derived protein and a polymer of aleuritic acid.

In one or more embodiments, the at least one plant-derived protein is selected between gliadin and zein. In a preferred embodiment, the plant-derived protein is zein.

The at least one plant-derived protein, preferably zein, is present in the dissolving solution in an amount comprised between 50% and 75% by weight, preferably between 50% and 60%, more preferably 55% of the total amount of the at least one plant-derived protein plus aleuritic acid.

Aleuritic acid, a naturally occurring polyhydroxylated fatty acid, is present in the dissolving solution in an amount comprised between 25 and 50% by weight, preferably between 40 and 50%, more preferably 45% of the total amount of the at least one plant-derived protein plus aleuritic acid.

In one or more embodiments, the electrically conductive material, preferably comprising graphene nanoplatelets, is dispersed in the dissolving solution in an amount comprised between 2 and 40% by weight, preferably between 30 and 40%, more preferably 30% of the total amount of the at least one plant-derived protein plus aleuritic acid in order to achieve a conductive ink.

In one or more embodiments, the hot-pressing is carried out at a temperature comprised between 160 and 200° C., preferably at 190° C.

In one or more embodiments, the hot-pressing is carried out at carried out at a pressure comprised between 5 and 20 bar, preferably between 10 and 20 bar, more preferably at 20 bar.

BRIEF DESCRIPTION OF THE DRAWINGS

One or more embodiments will now be described, purely by way of non-limiting example, with reference to the annexed drawings, in which.

Assignations for cellulose (black), the aleuritic acid polymer, and zein are included. B, comparison of "cellulose+zein" and "cellulose+aleuritic acid+zein" samples in the 1800-1480 $cm^{-1}$ spectral range. Assignations for the cutin-like polymer and zein are included. C, molecular schematic representation about the interactions between the aleuritic acid polymer and both cellulose and zein.

Figure 3:
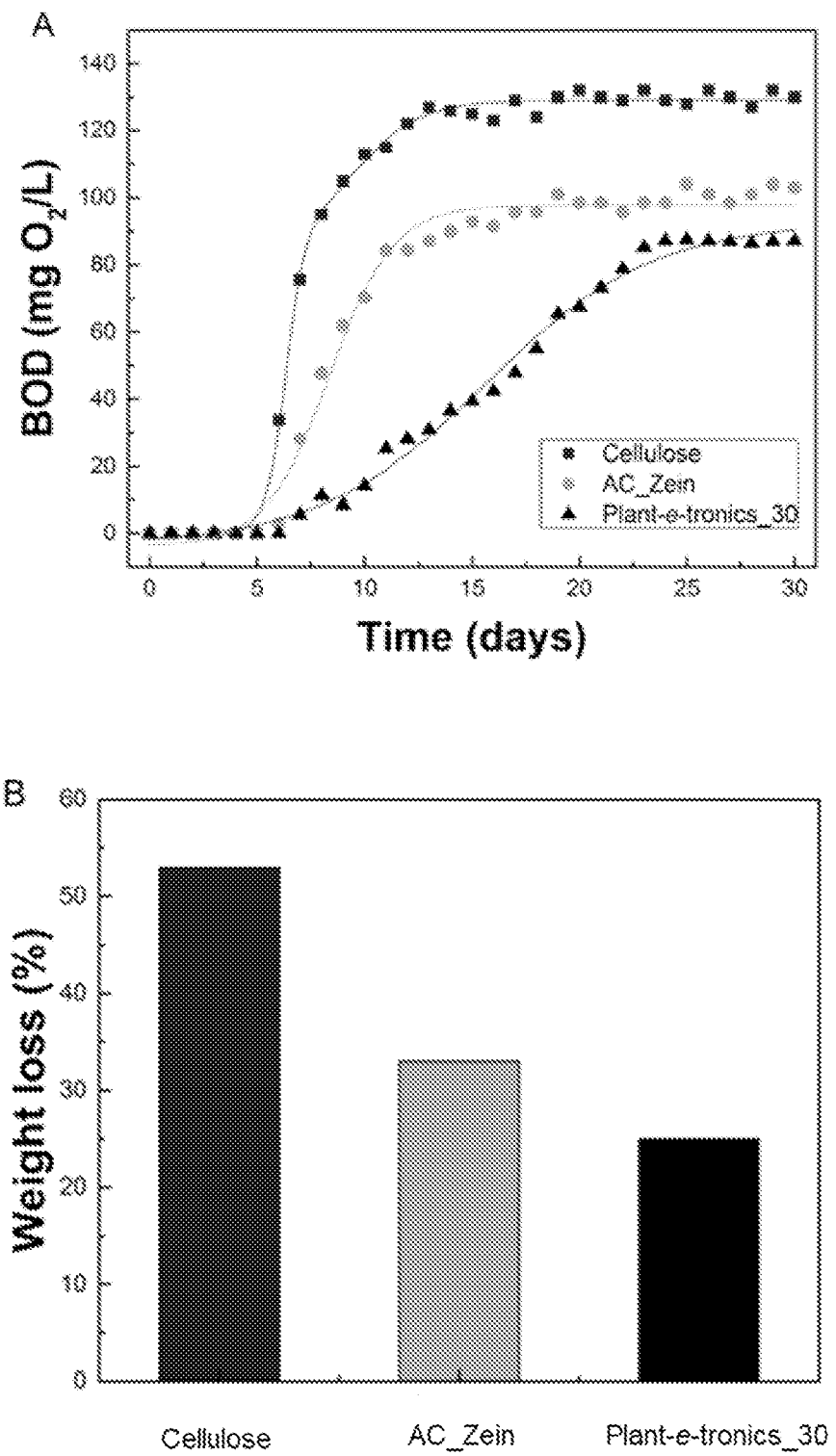

FIG. 3: A, biological oxygen demand data of cellulose, cellulose with zein and polyaleuritate (AC_Zein) and cellulose-based composite according to embodiments of the instant disclosure ("Plant-e-tronics_30", in the figure). B, weight loss for the different samples after BOD tests.

Figure 4:
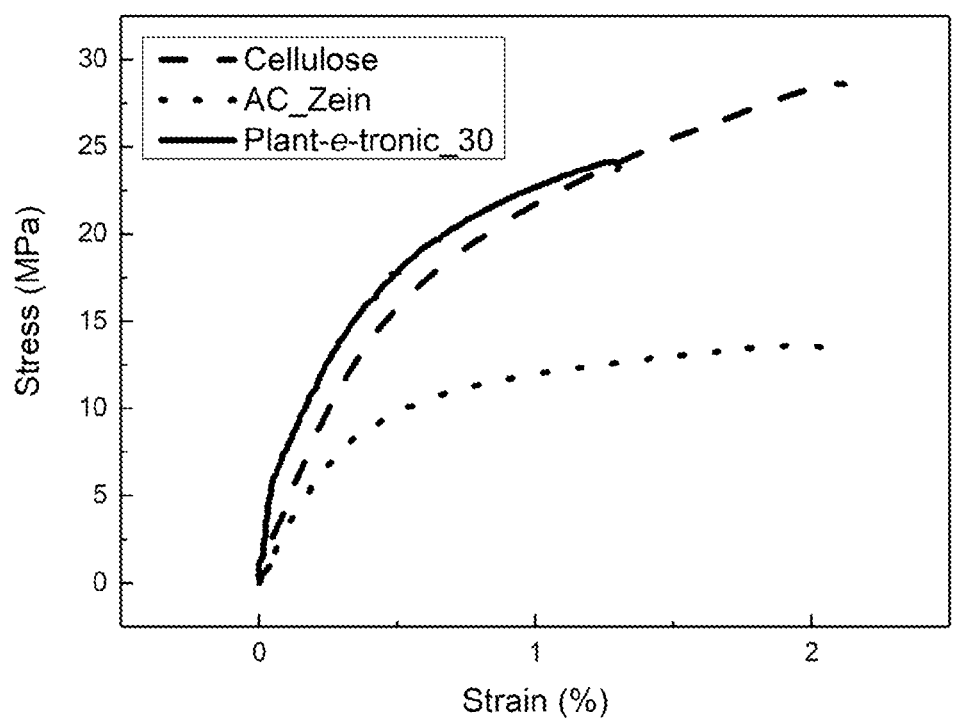

FIG. 4: Stress-strain curves of pure cellulose, cellulose-based composite according to embodiments of the instant disclosure ("Plant-e-tronics_30") and cellulose-based composite comprising zein and polyaleuritate ("AC_Zein").

Figure 5:
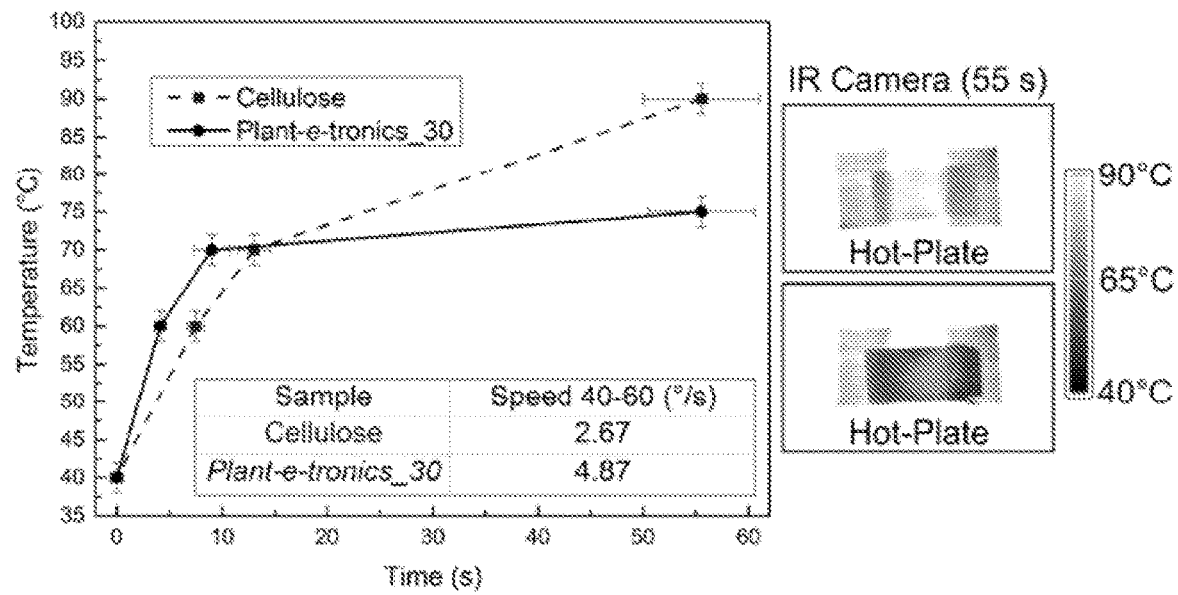

FIG. 5: Infrared Camera measurements of pure cellulose and cellulose-based composite according to embodiments of the instant disclosure ("Plant-e-tronics_30"). On the left, samples temperature as a function of time. On the right, infrared camera images at 55s.

Figure 6:
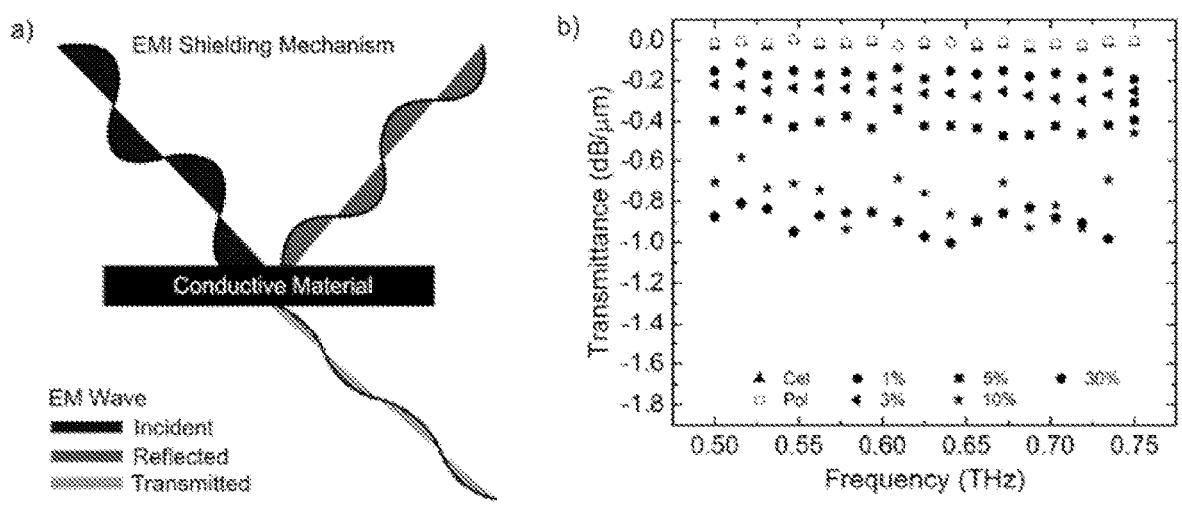

FIG. 6: a) Schematic of the EMI shielding Mechanism. b) Terahertz EMI shielding characteristics of the biocomposites in terms of frequency-dependent transmittance. Cel and Pol are the pure cellulose and the fibrous substrate modified with Zein and AC, respectively.

Figure 7:
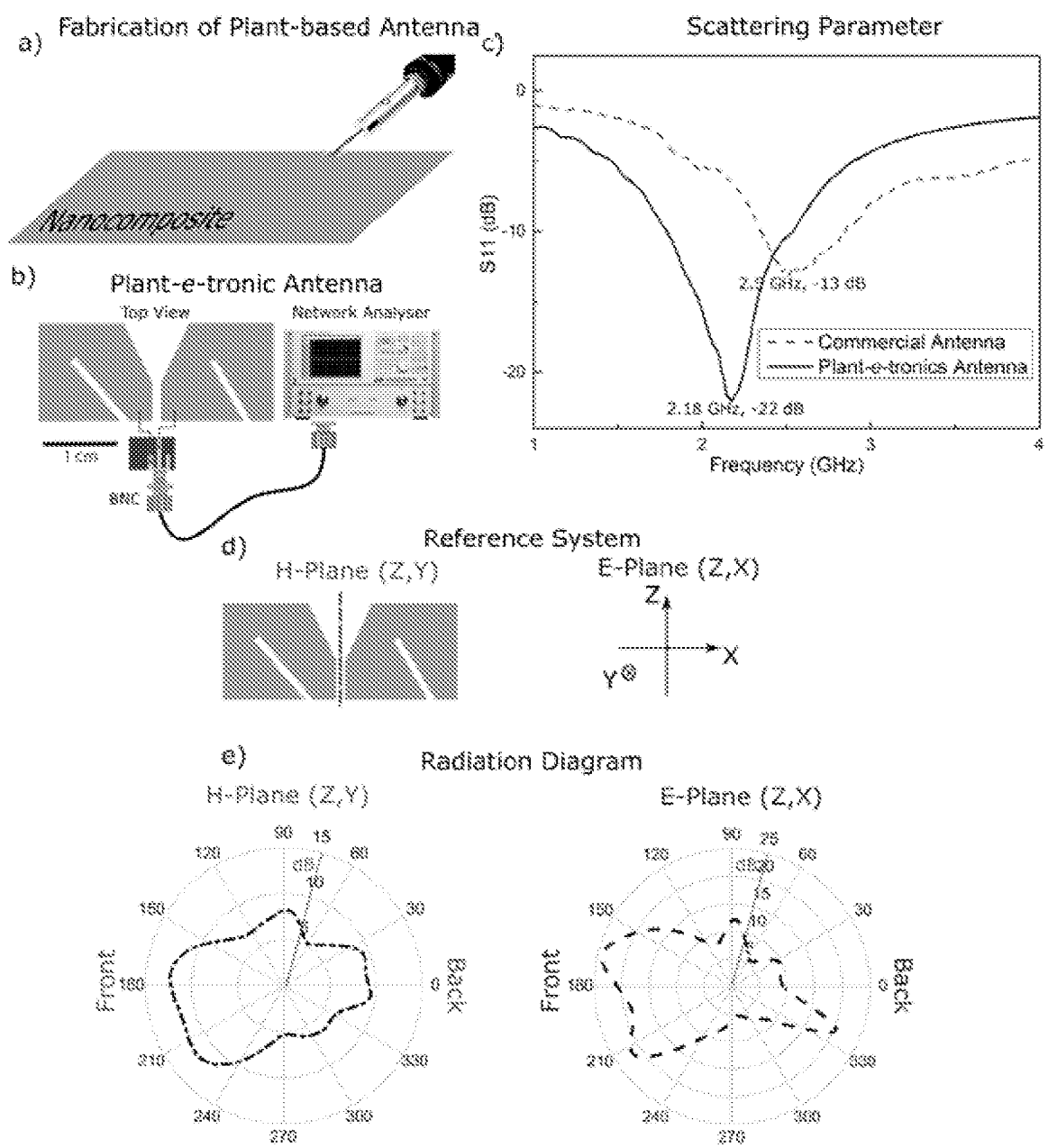

FIG. 7: a) Scheme of the laser-cut fabrication of the conductive part of the antenna. b) Top view of the antenna and experimental setup. c) Measured return loss of the Plant-e-tronics antenna and the commercial antenna. d) Reference system for the radiation pattern measurements. e) Radiation pattern of the plant antenna at 1.73 GHz in the H- and E-plane. Solid line represents the DB scale.

Figure 8:
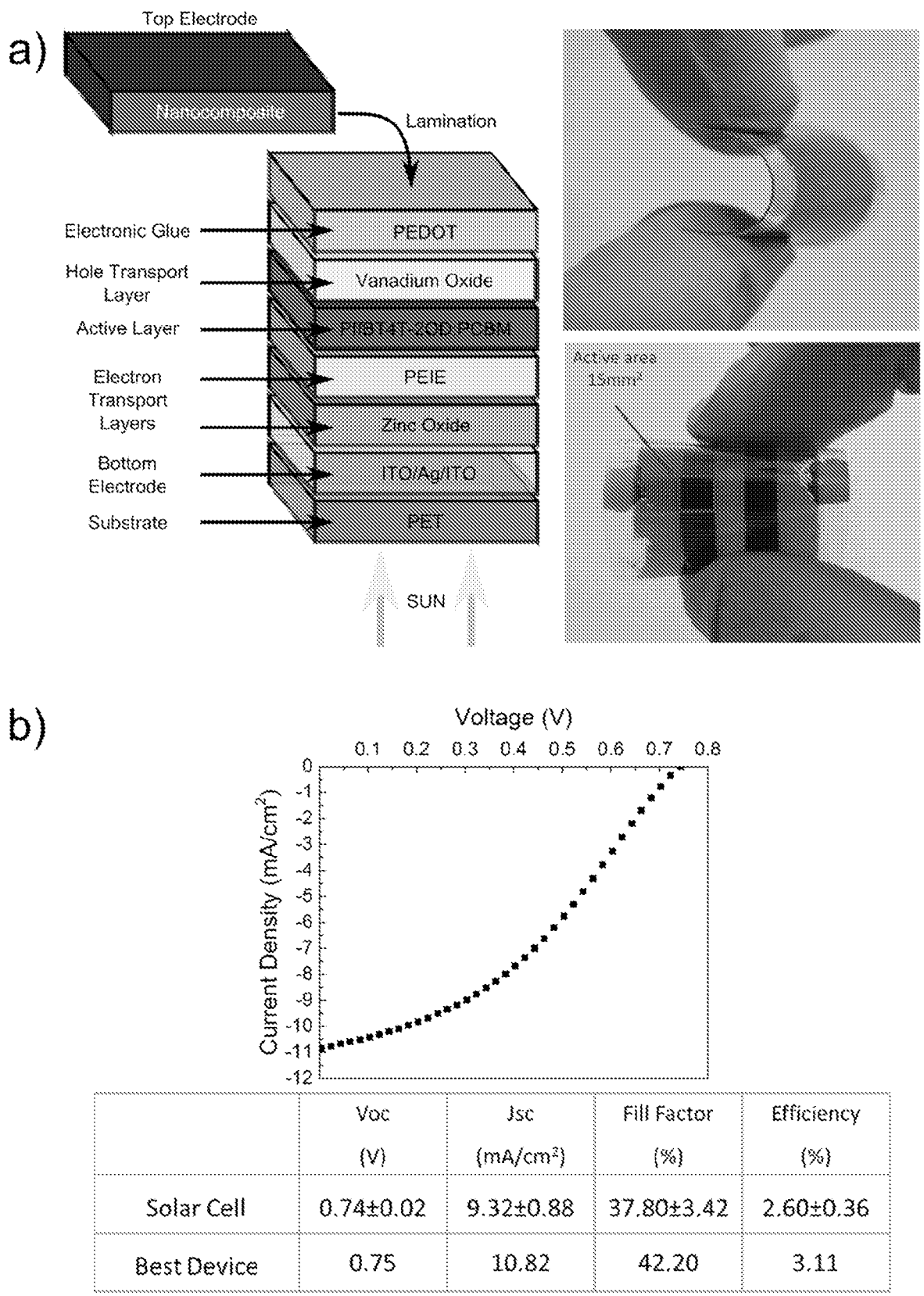

FIG. 8: a) On the left: schematic of the multilayer structure of a fully-sprayed polymer solar cell. On the right: photograph of the obtained devices. b) J-V characteristic of the best device and table with the resume of the electrical parameters of the photovoltaic cell.

DETAILED DESCRIPTION OF THE INVENTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

The present disclosure relates to the field of foldable conductive biomaterials suitable to be employed in several flexible electronic devices.

The present disclosure provides a cellulose-based composite material comprising a cellulose substrate impregnated with an electrically conductive material dispersed in a matrix comprising at least one plant-derived protein and a polymer of aleuritic acid (polyaleuritate).

Electrically conductive materials can be generally used to induce electrical conductivity, for example to flexible substrates. Among them, carbon-based organic nanofillers are particularly promising in light of their astonishing mixture of diverse properties, i.e. high electrical and thermal conduction, lightweight and flexibility.

The electrically conductive material contained in the cellulose-based composite herein disclosed can be selected in the group consisting of: graphene nanoplatelets, carbon nanofiber, carbon nanotube, carbon black, silver nanoparticles, gold nanoparticles, aluminum nanoparticles and mixtures thereof.

In one or more embodiments, the electrically conductive material contained in the cellulose-based composite herein disclosed consists of graphene nanoplatelets (GnPs).

Graphene nanoplatelets are a carbon-based filler with improved electrical properties. Another advantage linked to the use of GnPs is that it is a low-cost material compared to other carbon-based nanomaterials.

Graphene nanoplatelets suitable to be used in the composite herein disclosed may have a lateral size comprised between 1 and 30 μm, preferably between 5 and 20 μm.

The electrically conductive material, preferably consisting of graphene nanoplatelets, is dispersed in a matrix comprising at least one plant-derived protein, preferably selected between zein and gliadin, and a polymer of aleuritic acid, i.e. a naturally occurring polyhydroxylated fatty acid.

Among plant-derived proteins, corn-derived proteins are very interesting in view of the evidence that, corn is globally, among farmed crops, the cereal with the highest production. Particularly, zein is a corn-derived protein widespread in bakery products and food packaging/safety applications; this protein is thus largely available, renewable and biodegradable.

A drawback linked to the use of zein in application requiring particular mechanical performance may be linked to its intrinsic rigidity and the need of plasticizers to be used in combination with.

The Inventors of the instant application surprisingly found that a specific combination of zein with a polymer of aleuritic acid allows achieving a flexible composite without the need of using plasticizers.

Aleuritic acid (9,10,16-trihydroxyhexadecoic acid) is a naturally occurring polyhydroxylated fatty acid. Aleuritic acid is an accessible and renewable feedstock for synthetic long-chain polyhydroxyesters, being isolated from shellac, a natural lac resin.

The polymer derived from the polymerization of 9,10,16-trihydroxyhexadecoic (aleuritic acid; AC) is generally known as polyaleuritate.

Polyaleuritate is a cutin-like polyester that can be synthetized by enzymatic, emulsion, or free-solvent non-catalyzed melt-polycondensation of aleuritic acid, as disclosed in Bentez et al., (2015) "Polyhydroxyester films obtained by non-catalyzed melt-polycondensation of natural occurring fatty polyhydroxyacids", Frontiers in Materials 2, 59 https://doi.org/10.3389/fmats.2015.00059 and in Heredia-Guerrero, et al., (2017) "All-Natural Sustainable Packaging Materials Inspired by Plant Cuticles" *Advanced Sustainable Systems* 1600024(1) (1-9). The last approach has ecological advantages due to the fact that use of catalysts and solvents is avoided and water is the single by-product derived from the chemical reaction.

Similarly to the cutin of plants (the biopolyester that covers and protects the epidermis of aerial parts of plant such as leaves, fruits, petals, and non-lignified stems), polyaleuritate shows high waterproof and barrier properties as well as full biodegradability in short-times.

The cellulose-based composite herein disclosed is obtainable by first dissolving at least one plant-derived protein and aleuritic acid in a dissolving solution.

The dissolving solution may comprise methanol and chloroform, preferably in a ratio of 1:1 (vol:vol).

In one or more embodiments, the at least one plant-derived protein is present in the dissolving solution in an amount comprised between 50 and 75% by weight, preferably between 50 and 60%, more preferably in an amount of 55% of the total amount of the at least one plant-derived protein plus aleuritic acid (AC).

In one or more embodiments, aleuritic acid is present in the dissolving solution in an amount comprised between 25 and 50% by weight, preferably between 40 and 50%, more preferably in an amount of 45% of the total amount of the at least one plant-derived protein plus aleuritic acid.

The electric conductive material, preferably consisting of graphene nanoplatelets, is dispersed in the dissolving solution in an amount comprised between and 40% by weight, preferably between 30 and 40%, more preferably 30% of the total amount of the at least one plant-derived protein plus aleuritic acid in order to achieve a conductive ink.

The expression "conductive ink" means a colored liquid endowed with electrical conductivity having the electric conductive material dispersed therein.

The expression "cellulose-based composite material" means a composite material comprising a cellulose substrate.

The cellulose substrate may be a laminar or planar substrate.

The liquid conductive ink is then distributed on at least one side of a cellulose substrate.

The cellulose substrate may have a thickness comprised between 30 and 100 μm, preferably between 40 and 70 μm.

The conductive ink may be spray coated on the cellulose substrate. The spray coating may be carried out for example by using spray guns or airbrushes known in the art.

The distance between the dispenser used for the spray gun and the cellulose substrate may be comprised between 10 and 20 cm.

In particular, when the liquid conductive ink is distributed on the cellulose substrate by using a spray gun the distance between the dispenser and the cellulose substrate may be comprised between 10 and 20 cm.

The pressure of supply of the liquid conductive ink through a spray gun may be comprised between 0.8 and 3 bar, preferably 2.0 bar for pressure driven spray.

When the liquid conductive ink is distributed on the cellulose substrate by using an airbrush the distance between the dispenser and the cellulose substrate is between 15 and 18 cm. The pressure is comprised between 0.8-3 bar, preferably 2.0 bar.

The cellulose substrate comprising the conductive ink distributed thereon is then hot-pressed to achieve impregnation of the cellulose substrate with the conductive ink and polymerization of aleuritic acid into polyaleuritate.

The hot-pressing may be carried out at a temperature comprised between 160 and 200° C., preferably at 190° C.

The hot-pressing may be carried out at a pressure comprised between 5 and 20 bar, preferably between 10 and 20 bar, more preferably at 20 bar.

In one or more embodiments, the cellulose-based composite material comprises the electrically conductive material, preferably consisting of GnPs, in a weight percentage comprised between 1.5 and 23% of the composite comprising cellulose, the at least one plant-derived protein, aleuritic acid, the electrically conductive material.

In one or more embodiments, the plant-derived protein may be present in an amount of 55% by weight, aleuritic acid may present in an amount of 45% by weight and GnPs may be present in an amount of 30% by weight of the total amount of zein plus aleuritic acid in the dissolving solution.

After hot-pressing and thus polymerization of aleuritic acid into polyaleuritate, the polymer acts as a plastic matrix for the electrically conductive dispersion.

Figure 2:
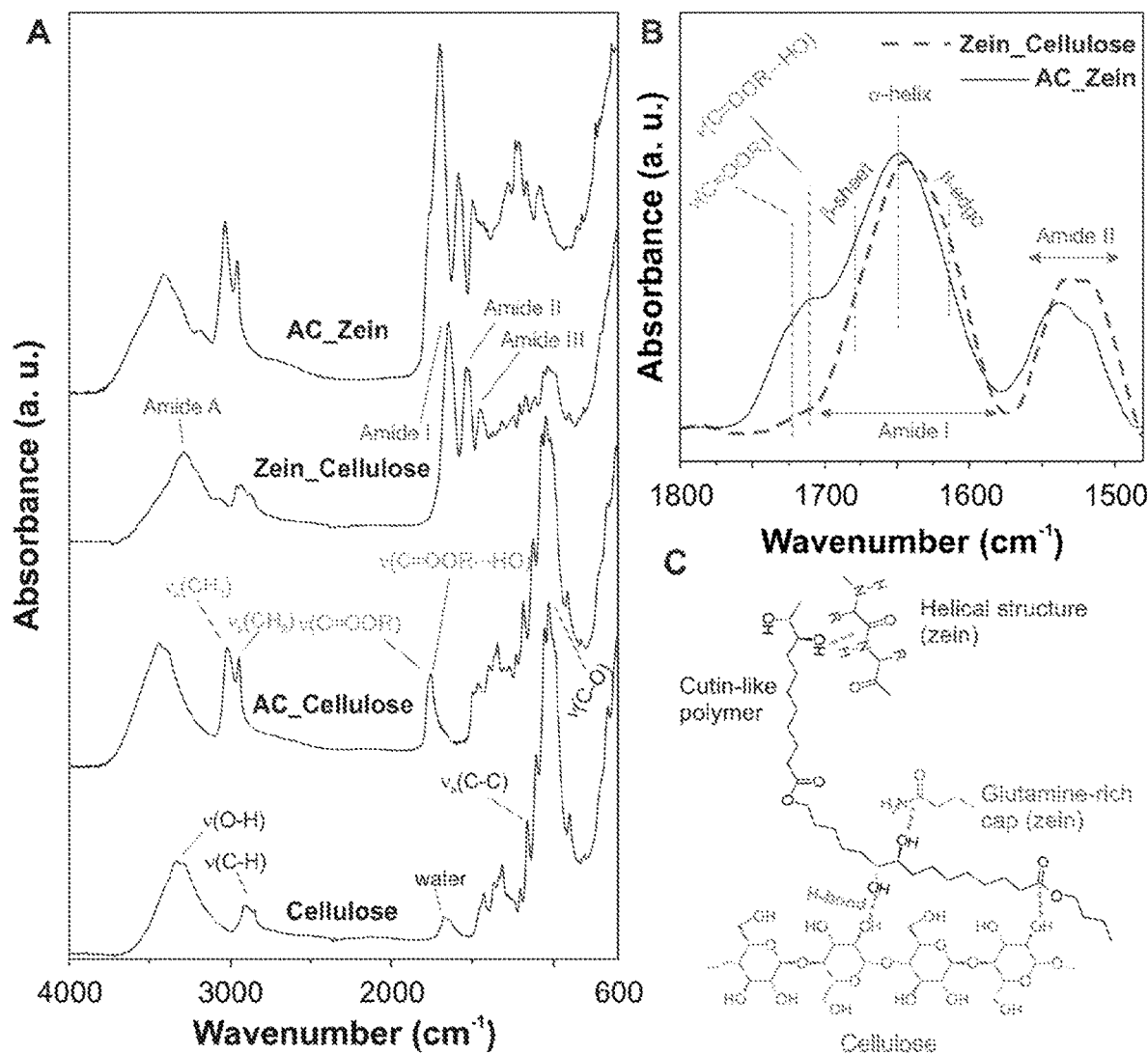
FIG. 2: ATR-FTIR spectra of the substrate (cellulose), "cellulose plus aleuritic acid", "cellulose plus zein" and "cellulose plus aleuritic acid plus zein" composites.

The Inventors of the instant application also showed that the specific combination of zein and aleuritic acid (AC) provides a composite with the most promising flexibility. The aleuritic acid polymer, polyaleuritate, in particular, acts as compatibilizer between zein and cellulose (as shown in FIG. 2).

The cellulose-based composite herein disclosed is free of plasticizers. In addition, it may be obtained by a versatile and easy method.

The plant-derived protein, preferably zein, and the monomer, aleuritic acid, are used in pure form without any prior processing into a synthetic product.

EXAMPLES

Materials and Methods

Cellulose substrates (approximately 30-40 μm thick) were purchased from Korff (Art. Num. 60285). Zein was obtained by Sigma Aldrich (CAS number 9010-66-6). Aleuritic acid (9,10,16-trihydroxyhexadecanoic acid, 98% purity by NaOH titration) was acquired from TCI Europe. Graphene nanoplatelets were kindly donated by Directa Plus (grade Ultra G+). Chloroform and methanol (analytical degree) were bought from Sigma-Aldrich.

Cellulose-Based Composite Production

Zein and aleuritic acid (AC) were dissolved in a solution and mixed with GnPs, as disclosed in the following.

Zein (0.5 g) and AC (0.4 g) were dissolved in a dissolving solution comprising chloroform and methanol in a volume ratio 1:1 (vol:vol) (total volume 30 ml).

Graphene nanoplatelets (0.3 g) were added to the dissolving solution and homogeneously dispersed trough tip sonication (Sonics & Materials, Inc., Model Num. VCX750, 750 W, 40% amplitude, 20 kHz, 3 times for 30 s) obtaining a conductive ink.

4 ml of the conductive ink was spray coated (2.0 bar, 15-18 cm distance, Paasche Air Brush, USA) on both sides of cellulose substrate samples having a rectangular shape with a surface area of 15 $cm^2$.

The conductive ink was spray coated on both sides of the cellulose substrate samples obtaining coated cellulose substrate samples.

The sprayed cellulose substrate samples were hot-pressed by using a Specac-Atlas Power Presses T8 for 20 minutes at a temperature of 190° C. and at a pressure of 20 bar.

The hot-pressing allowed achieving i) impregnation of the cellulose substrates with the conductive ink and ii) polymerization of aleuritic acid into polyaleuritate polyester.

Teflon anti-stick films (Advent Research Material, Art. Num. FP823338) were used during the hot-pressing procedure to avoid sticking of the nanocomposites on the press platen.

After hot-pressing and thus polymerization of aleuritic acid, both zein and the polymer acted as a plastic matrix for the GnPs. The polyester, in particular, acted as compatibilizer between zein and cellulose.

The obtained cellulose-based composite has been tested as disclosed in the following and identified in the figures as "Plant-e-tronics_30".

Comparative, experimental test (disclosed in the following) were also carried out on:

i) samples of pure, uncoated hot-pressed cellulose substrates (samples identified as "Cellulose" in the figures), ii) samples of hot-pressed cellulose substrates coated with zein and aleuritic acid (without GnPs) and identified as "AC_Zein" in the figures.

Scanning Electron microscope (SEM) images of the prepared samples were acquired through A JEOL microscope (model JSM-6490LA) operating at an acceleration voltage of 15 kV.

Figure 1:
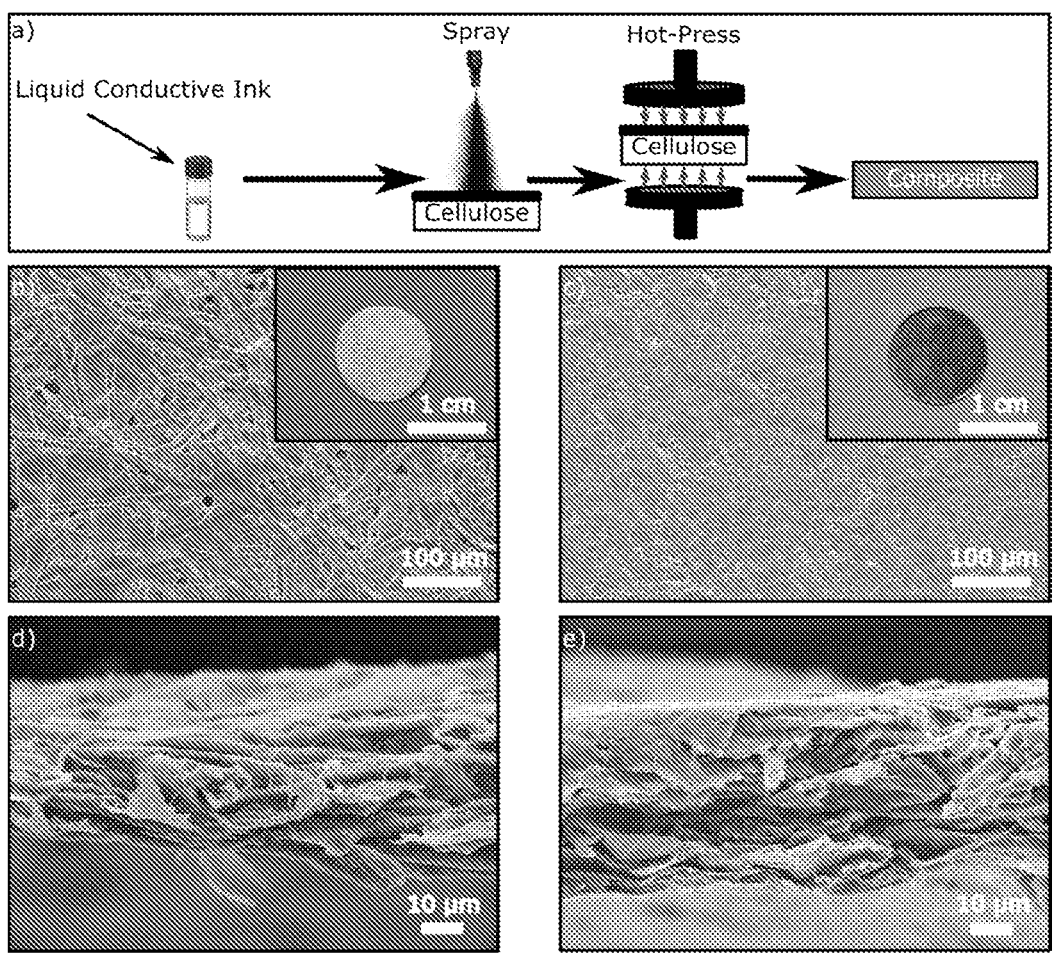
FIG. 1: a) Scheme of the preparation of the cellulose-based composite comprising electrically conductive material according to embodiments of the instant disclosure. From left to right, conductive ink, spray-coating and hot-pressing assisted impregnation. b) Scanning electron microscopy (SEM) images of the morphology of a bare cellulose network with the relative photograph in the inset. SEM topography (c) of a cellulose-based composite comprising GnPs with the relative photograph as an inset. d) and e) SEM cross sections of the samples shown in b) and c), respectively.

FIG. 1b and FIG. 1c show a sample of an uncoated (not impregnated) cellulose substrate and a composite obtained as disclosed in the instant application, respectively.

As it can be appreciated in the higher magnification inset of FIG. 1b the cellulose substrate's surface appears whitish. In contrast, the surface of the composite obtained as disclosed in the instant application appears significantly darker, due to the presence of the GnPs dispersed therein (inset of FIG. 1c).

In addition, the micro-morphology is markedly different, the substrate's surface of the cellulose not impregnated substrate showing a fiber network whereas the substrate's surface of the composite obtained as disclosed appearing more regular and flat. Interestingly, as displayed in the cross-section images of FIGS. 1d and 1e, uncoated and coated cellulose substrates preserve approximately the same thickness (40 micron), indicating that most of the conductive ink is embedded inside the fibers interlaces.

Ad-Hoc Chemical Interaction

Cellulose-based composites were chemically characterized by ATR-FTIR (as shown in FIG. 2).

Infrared measurements of samples were obtained with an ATR accessory (MIRacle ATR, PIKE Technologies) coupled to FTIR spectrometer (FT/IR-4100, JASCO). All spectra were recorded in the range from 3800 to 600 $cm^{-1}$ with 4 $cm^{-1}$ resolution, accumulating 128 scans. In a typical measurement, the sample was gently placed on the spot of the ATR accessory and slowly pressed.

A cellulose pure not impregnated sample was characterized by the typical cellulose bands: OH stretching mode at 3331 $cm^{-1}$, CH stretching mode at 2885 $cm^{-1}$, adsorbed water at 1655 $cm^{-1}$, asymmetric C—C stretching mode at 1161 $cm^{-1}$, and C—O stretching mode at 1030 $cm^{-1}$.

When the aleuritic acid polymer (polyaleuritate polyester) is formed during hot-pressing, additional bands from the polyhydroxylated long-chain polyester were observed: asymmetric and symmetric $CH_2$ stretching mode at 2926 $cm^{-1}$ and 2851 $cm^{-1}$, respectively, and C=O stretching mode of free and H-bond interacting ester groups at 1726 $cm^{-1}$ and 1717 $cm^{-1}$, respectively.

This spectroscopic pattern has been associated with the formation of H-bonds between the hydroxyl groups of cellulose and the OH and ester groups of polyaleuritate.

Furthermore, bands from cellulose are very strong, indicating that polyaleuritate was impregnated inside the substrate.

Main bands of the sample of cellulose hot-pressed with zein, a plant protein with a cylindrical shape formed by nine antiparallel helices and glutamine-rich caps in the extremes, were attributed to the protein: amide A at 3281 $cm^{-1}$, amide I at 1639 $cm^{-1}$, amide II at 1524 $cm^{-1}$, and amide III at 1447 $cm^{-1}$.

Interestingly, ATR-FTIR spectrum of untreated zein displayed identical wavenumbers, revealing that hot-pressing did not affected the protein structure.

On the other hand, bands ascribed to cellulose showed no shifts, most likely due to the not interaction between both polymers. When a mixture of aleuritic acid and zein was hot-pressed on the cellulose substrate, the above described bands ascribed to the polyaleuritate and the protein were detected. Main spectroscopic modifications were observed in the amide I and II bands of zein, as illustrated in FIG. 2B. Major contributions to the zein's amide I band were α-helical structures (1640 $cm^{-1}$), β-sheets (1685 $cm^{-1}$), and β-edges (~1615 $cm^{-1}$). The spectroscopic profile of the amide I band changed when polyaleuritate was present: the maximum of the peak shifted to 1647 $cm^{-1}$, the intensity of the region related to β-edges decreased, while the intensity of the region related to β-sheets increased. Concerning amide II, a band that is sensible to the H-bond network, the relative intensity of the peaks at 1537 $cm^{-1}$ and 1518 $cm^{-1}$ was decreased for the sample with polyaleuritate. Similar changes have been described for the plasticization and formation of complexes with zein and were justified by the formation of H-bonds of zein (helical and glutamine-rich parts) with substances such as water, glycerol, 2-mercaptoethanol, and iodine. Identical results were obtained when graphene was added to the mixture of aleuritic acid and zein.

Based on the above results a molecular scenario is proposed in FIG. 2C. In this model, polyaleuritate is shown as being interacting with both cellulose and zein through H-bonds between hydroxyl and ester groups of the polyaleuritate with hydroxyl groups of the polysaccharide and amide groups of the protein. In such conditions, polyaleuritate can act as a compatibilizer and binder of cellulose and zein.

Biodegradability

Biodegradability was evaluated through a standard biochemical oxygen demand (BOD) test by measuring the oxygen amount consumed in 30 days in a biodegradation reaction in water. For each sample, three measurements were collected and the results were averaged to obtain a mean value. Carefully weighed samples (~200 mg) were finely minced and immersed in 432 mL bottles containing seawater collected from the Genoa (Italy) area shoreline. Oxygen consumed during the biodegradation process was recorded at different time intervals by using sealed OxyTop caps on each bottle which can assess the oxygen levels. BOD from blank bottles filled with only seawater was also measured for reference.

FIG. 3A shows the oxygen consumption for i) an uncoated cellulose substrate ("Cellolose" in figures), ii) a cellulose substrate impregnated and hot-pressed with zein and aleuritic acid ("AC_Zein" in the figures) and iii) cellulose substrate composite impregnated and hot-pressed with a conductive ink comprising zein, aleuritic acid and GnPs (Plant-e-tronics_30 in the figures).

In general, all the samples exhibited a high biodegradability. For the material prepared from pure paper, the biodegradation started after 5 days and reached a plateau after 13 days at 130 mg $O_2$/L.

The sample comprising zein and polyaleuritate started to degrade after 5 days, reaching the maximum oxygen consumption after around 17 days at 99 mg $O_2$/L.

Finally, for the sample containing GnPs, the degradation was initiated after 6 days, achieving the plateau after 24 days with an oxygen consumption of 87 mg $O_2$/L.

After BOD test, the remaining materials were collected and characterized. The weight loss is presented in FIG. 3B. As observed, the pure uncoated cellulose substrate presented the highest weigh loss (53% of its initial weight). For the sample containing zein and polyaleuritate ("AC-Zein") the weight loss was 33% and, finally, the sample also containing GnPs (Plant-e-tronics_30), the one with the lowest degradation in seawater, has a weight loss of 25% of its initial weight.

Cellulose-Like Mechanical Properties

Mechanical properties of the composite were measured by uniaxial tensile tests. A uniaxial testing machine (Instron 3365) was utilized to accomplish stress-strain mechanical tests on the composites and on the raw materials (initial length 25 mm, width 4 mm, deformation rate 1 mm/min).

Pure cellulose substrate and AC_Zein sample were tested for comparison. Dog-bone shaped samples (width w=4 mm, useful length l=25 mm) were stretched at a rate of 1 mm/min. The Young's modulus E, ultimate strength UTS and elongation at break values were evaluated from the stress-strain curves. Typical curves are reported in FIG. 4. The stress-strain trend of the AC_Zein sample presents lower stiffness and resistance compared with pure cellulose: the Young's modulus drops from 4.3±0.3 GPa to 2.9±0.4 GPa, the UTS from 30.3±1.7 MPa to 15.9±1.7 MPa, while the elongation is preserved.

The sample also comprising GnPs, on the other hand, leads to stress-strain curves with increased stiffness (Young's modulus E=10.2±1.4 GPa) and more brittle behavior (UTS=20.8±2.9 MPa, elongation at break approximately diminished of ⅓rd). Anyhow, both Plant-e-tronics_30 and AC_Zein samples preserve the same order of magnitude of Young's modulus, UTS and elongation at break of pure cellulose.

Note that it is impossible to produce free standing zein films with 30 wt % GnPs loading without the use of extensive amount of plasticizers as zein makes very brittle films; adding GnPs or any other rigid filler will make it much more brittle.

Hence, zein needs to be impregnated into a cellulose support. Nevertheless, the Inventors of the instant application also showed that it is the specific combination of zein and AC to provide a composite with the most promising flexibility.

Specifically, it has been proven that composites wherein zein it is not associated with AC fail the folding tests, as also shown in the tables below.

Table 1 shows the chemical compositions of different cellulose-based composites used for comparison tests. The amounts of zein, aleuritic acid (AC) and graphene nanoplatelets (GnPs) are expressed in Table 1 as weight % with respect to the total amount of zein and aleuritic acid.

TABLE 1

| Composite | Cellulose substrate | % zein | % AC | % GnPs |
|---|---|---|---|---|
| 1 | 100 | 0 | 0 | 0 |
| 2 | 100 | 0 | 100 | 0 |
| 3 | 100 | 100 | 0 | 0 |
| 4 | 100 | 57 | 43 | 0 |
| 5 | 100 | 57 | 43 | 30 |
| 6 | 100 | 0 | 100 | 30 |
| 7 | 100 | 100 | 0 | 30 |

Composite 1 is a pure cellulose substrate; composite 2 is a cellulose-based composite comprising AC, and it is free of GnPs; composite 3 comprises zein and it is devoid of AC and GnPs; composite 4 comprises zein, AC and it is devoid of GnPs; composite 5 comprises zein, AC and GnPS, i.e. it is the composite material disclosed in the instant application; composite 6 comprises AC and GnPs but it is devoid of zein; composite 7 comprises zein, GnPs and it devoid of AC.

The different composites have been undergone to hot-pressing in order to obtain the polymerization of AC.

Table 2 shows the results of comparison tests in terms of Young's Modulus, percentage of elongation, ultimate tensile stress and folding cycles before electrical failure between the composite of the instant disclosure (composite 5) and the other comparative different composites (1-4 and 6, 7).

| Composite | Young's Modulus (Gpa) | % Elongation | Ultimate tensile stress | Folding cycles before electrical failure |
|---|---|---|---|---|
| 1 | 1.6 | 2.5 | 12 | n/a |
| 2 | 3.0 | 1.3 | 16 | n/a |
| 3 | 1.9 | 1.6 | 13 | n/a |
| 4 | 3.0 | 2.1 | 16 | n/a |
| 5 | 10.2 | 1.3 | 21 | >20 |
| 6 | 8.5 | 0.7 | 19.6 | 8 |
| 7 | 7.8 | 0.65 | 17.3 | 5 |

The table clearly shows, especially considering composite 5, 6 and 7, that only the combination of zein and AC (composite 5) is able to provide a stable and foldable conductive product, with a number of folding cycles for composite 5 before electrical failure >20.

Improved Heat Transfer

The thermal properties of pure uncoated cellulose substrates and of the composite herein disclosed with 30% by weight GnPs with respect to the total amount of zein and aleuritic acid were investigated via IR-camera (FLIR A310) and using FLIR Researcher software for image analysis. The samples were placed on a hot plate (IKA, model C-MAGHP10) at 145° C., kept at distance of 0.6 cm from the hot surface. In this way, the samples were heated-up by the convective heat transfer exerted by air. The range of the measurement was set between 40° C. to 90° C.

Since an efficient percolating thermally conductive nanoparticle network ensures a significantly reduced thermal interface resistance, the heat transfer properties of a substrate only containing cellulose and of a sample of the composite disclosed in the instant application was tested by employing an Infrared camera.

Samples were heated-up in a set up by hot-air convective heating coming from an hot-plate placed underneath the samples (FIG. 5). The sample temperature recorded as a function of time are plotted in FIG. 5. The sample of the composite herein disclosed (identified as "Plant-e-tronics_30") shows an improved heat diffusion compared with the substrate only containing cellulose.

Indeed, between 40 and 60° C. the composite of the instant disclosure heat-up faster than substrate only containing cellulose (see Table in FIG. 5). Afterwards, the composite herein disclosed reach a plateau around 70° C. while the substrate only containing cellulose keep heating-up reaching the saturation temperature of the infrared camera set at 90° C. (right part of FIG. 5). Therefore, the composite of the instant disclosure is able to dissipate heat faster than pure cellulose.

EMI Shielding

The EMI shielding measurements were performed using a WR-1.5 (0.50-0.75 THz) Vector Network Analyzer (VNA) system, i.e., a Kesight N5245A PNA in conjunction with two Virginia Diodes Inc. (VDI) WR-1.5 extenders. Measurements were done after turning on the system for about an hour to reach a steady state. The ratio of the received power to the incident one (or transmittance) characterizes the EMI shielding effectiveness (SE) of the sample. The measured transmittance was normalized to sample thickness for a fair comparison.

In light of the low sheet resistance ($\approx$10 $\Omega$/sq), lightweight, biodegradability and flexibility of the composite herein disclosed, it is an ideal candidate for efficient EMI shielding, enabling a range of applications in the field of green technology. In particular, considering the increasing speed of electronics appliances, high frequency EMI shielding (i.e., in the range of THz) is gaining constantly importance in fields as diverse as security, spectroscopy, optoelectronics, defense, imaging, space science and biological sensing. Therefore, the composite herein disclosed was exploited to substitute expensive, rigid and corrosion-susceptible metallic conductors as THz shield, contributing to the rise of high-speed circuit applications built with safe components for the environment. The EMI shielding measurements were performed at frequencies between 0.5 and 0.75 THz for normal incidence (see FIG. 6) on plant-based biocomposite samples with different GnPs loads. All the losses of the incoming electromagnetic wave due to screening (SE, also known as EMI shielding effectiveness) were calculated using SE(dB)=−10 log($P_t/P_i$), where $P_t$ is the transmitted electromagnetic power and $P_i$ is the incident power. The ratio $P_t/P_i$ is called transmittance and is a function of the frequency of the incoming EM wave. In FIG. 6b the EMI SE (i.e. the absolute value of the transmittance) normalized with respect to sample thickness as a function of the frequency of the incident EM waves is reported for samples with different GnPs loads. The average SE improved from 0 dB/μm for the pure cellulose sample to approximately 0.8 dB/μm for the plant-nanocomposites with 10 wt. % GnPs concentration, and around 0.9 dB/μm for the sample with 30 wt. % GnPs load. The obtained results are approaching some of the highest attenuation levels reported (i.e., ~1 dB/μm) for other carbon-based nanocomposites in literature. The shielding effectiveness reported in this work achieves a value of 45 dB for the 50 μm thick 30 wt. % GnPs sample (or normalized SE of 0.9 dB/μm), significantly exceeding the threshold value of EMI SE required for commercial applications (i.e., 20 dB, or less than 1% transmittance of electromagnetic wave). Overall, the cellulose-based composites herein disclosed offer high THz shielding performance, showing great potential to replace conventional metallic conductors as THz shielding materials.

Antenna

Two WR-1.5 horn antennas were employed at the ends of the two extenders to couple the electromagnetic wave (THz signal) to and from the air. The THz signal from the horn antenna of the first extender was reflected/collimated by a parabolic mirror to normally incident onto the plant-based biocomposite sample under test.

The transmitted THz signal was then reflected/focused by another parabolic mirror onto the horn antenna of the second extender.

Conformable antennas have been already investigated depositing conductive metal-based geometries on flexible plastic substrates. Anyhow, the materials employed are not always sustainable and lightweight. A versatile and easy method to produce flexible and environmentally friendly antennas was developed employing the cellulose-based composites herein disclosed as conductor. The composite was laser-cut and shaped copying the design of a commercially available WI-FI antenna (FIGS. 7a and b). The antenna was then characterized measuring different antenna features.

One of the most common characteristics used to describe the performances of an antenna is the scattering parameter or return loss or reflection coefficient (S11). When expressed in dB, it represents how much power is reflected from the antenna. If S11=0 the antenna is not working, since all the power is reflected and nothing is radiated. The return loss of both antennas (commercial antenna and Plantronic-based) was measured with a Network Analyzer, as schematically shown in FIG. 7b. Both antennas were placed on a flexible cardboard.

FIG. 7c shows the return loss of the two antennas recorded in the frequency band 1-4 GHz. It highlights that the commercial antenna (dashed line) is, as expected, resonating at 2.5 GHz with a return loss of −13 dB, and its −10 dB bandwidth is 0.45 GHz. The fabricated antenna (black solid line), instead, shows a resonance at 1.73 GHz, with a return loss of approx. −22 dB and a −10 dB bandwidth of 0.54 GHz.

The prototype showed smaller reflection coefficient and wider operative bandwidth compared to the commercial antenna, in other words, at its resonance the power fed to the antenna was effectively radiated. The relatively small return loss of the plant-antenna is a direct consequence of the low and stable electric conductivity. The different resonant frequency with respect to the commercial antenna is determined by the different interaction of the material employed for the antenna manufacturing with the dielectric environment (air and the substrate). For an engineered design of the prototype antenna, its resonance could significantly right-shift towards WI-FI frequency.

Afterwards we derived the radiation diagram of the fabricated antenna, which graphically represents its radiation properties as a function of the incidence angle. FIG. 7d shows the radiation pattern in polar coordinates of the antenna at its resonance. The peaks (lobes) represent the distribution of power at different angles. The total gain pattern in the horizontal and vertical plane (H- and E-plane, respectively) highlights ≈15 dB gain in correspondence of the horn aperture (between 150° and 240°, 90° angle of aperture). The front to back ratio, which corresponds to the ratio of power gain between the front and rear of the fabricated antenna, is 4 dB (approx. 160% of directionality). The front to back ratio was shown to be in the same range of the commercial antenna (2.6 dB, approx. 135% of directionality, see datasheet, http://www.molex.com/molex/products/datasheet.jsp?part=active/0479502011_ANTENNAS.xml&channel=Products&Lang=en_US), thus demonstrating its full functionality. The radio-frequency performances make the antenna a competitive candidate in a wide variety of wireless applications, such as RFID or high-speed communications.

Efficient Solar Cell Electrode

The composite herein disclosed was used as top electrode of a fully-sprayed Polymer Solar Cell (PSC), as schematically exhibited in FIG. 8a. The composite was laminated on top of a multilayer structure fabricated by spraying all the layers in air starting from a polyethylene terephthalate (PET) substrate coated with a ITO/Ag/ITO three-layer as transparent conductive bottom electrode. The active area of the flexible solar cell was 15 mm². An inverted configuration was chosen in light of its ease of scalability and compatibility with polymer:fullerene systems. Firstly, a double layer composed of ZnO (≈20 nm) and PEIE (≈10 nm) was sprayed as electron transport and extraction system, allowing a significant improvement of open circuit voltage ($V_{OC}$) and short circuit current ($J_{SC}$) compared to the use of bare ZnO or PEIE. The active layer was composed by PffBT4T-2OD polymer and $PC_{70}BM$ fullerene. This system was employed since it forms highly crystalline and sufficiently pure small polymer domains that ensure robust morphology and excellent performance. Another advantage is the ease of scalability due to the large thickness, thus facilitating the coating of large-area substrates, even with a rough and irregular surface. Notably, although chlorinated solvents are ideal for dissolving and processing the polymer:fullerene system, they were avoided during spray-deposition of the solar cell layer in order to address the target of a sustainable and industry-compatible process. Vanadium oxide ($V_2O_x$) was sprayed onto PffBT4T-2OD:$PC_{70}BM$ as hole transport layer, followed by the deposition of PEDOT:PSS/D-Sorbitol, which acts as an electronic glue between the sprayed stack and the plant-nanocomposite.

The overall electrical parameters of the PSCs and the J-V curve of the best device are displayed in FIG. 7b. The average power conversion efficiency was measured to be 2.6% with a maximum value of 3.1%. These results are comparable with those obtained with fully-sprayed devices which were finalized with different types of composites as the top electrode. This demonstrates that i) the composite material herein disclosed has a suitable value of sheet resistance for this application due to the favorable bulk morphology in the cellulose for the charge transport and ii) the interface with the electronic glue effectively works. The PSCs exhibit a relatively high $V_{OC}$, and lower $J_{SC}$ and fill factor (FF) if compared to devices with standard evaporated top electrode. This is ascribed to the recombination losses introduced when several sprayed layers stack on each other, mostly increasing the series resistance ($R_S$). However, the organic photovoltaic devices based on top electrode comprising a composite as herein disclosed have shown electrical performances significantly higher than other fully sprayed devices based on glass or fabrics and are viable candidates in flexible and wearable electronics.

The invention claimed is:

1. Cellulose-based composite material comprising an electrically conductive material dispersed in a matrix containing at least one plant-derived protein and a polymer of aleuritic acid, said cellulose-based composite material being obtainable by a process comprising the steps of:
dissolving the at least one plant-derived protein and the aleuritic acid in a dissolving solution to achieve a first mixture,
dispersing an electrically conductive material in said first mixture to achieve a conductive ink,
distributing said conductive ink on at least one side of a cellulose substrate to achieve a coated cellulose substrate,
hot-pressing said coated cellulose substrate to obtain i) impregnation of the cellulose substrate with said conductive ink and ii) polymerization of the aleuritic acid.

2. Cellulose-based composite material according to claim 1, wherein the at least one plant-derived protein is present in the dissolving solution in an amount comprised between 50 and 75% by weight of a total amount of the at least one plant-derived protein plus the aleuritic acid.

3. Cellulose-based composite material according to claim 1, wherein said at least one plant-derived protein is selected between gliadin and zein.

4. Cellulose-based composite material according to claim 1, wherein the aleuritic acid is present in the dissolving solution in an amount comprised between 25 and 50% of a total amount of the at least one plant-derived protein plus the aleuritic acid.

5. Cellulose-based composite material according to claim 1, wherein the electrically conductive material is selected in the group consisting of graphene nanoplatelets, carbon nanofiber, carbon nanotube, carbon black, silver nanoparticles, gold nanoparticles, aluminum nanoparticles, and mixtures thereof.

6. Cellulose-based composite material according to claim 1, wherein said electrically conductive material consists of graphene nanoplatelets.

7. Cellulose-based composite material according to claim 1, wherein said electrically conductive material is dispersed in said dissolving solution in an amount comprised between 2 and 40% by weight of a total amount of the at least one plant-derived protein plus the aleuritic acid in order to achieve said conductive ink.

8. Cellulose-based composite material according to claim 1, wherein the cellulose substrate has a thickness comprised between 30 and 100 μm.

9. Cellulose-based composite material according to claim 1, wherein said hot-pressing is carried out at a temperature comprised between 160 and 200° C.

10. Cellulose-based composite material according to claim 1, wherein said hot-pressing is carried out at a pressure comprised between 5 and 20 bar.

11. Cellulose-based composite material according to claim 1, wherein the dissolving solution comprises methanol and chloroform.

12. Cellulose-based composite material according to claim 1, wherein the distributing of said conductive ink on at least one side of a cellulose substrate to achieve a coated cellulose substrate is carried out by spray coating.

13. Cellulose-based composite material according to claim 1, wherein the at least one plant-derived protein is present in the dissolving solution in an amount comprised between 50 and 60% of a total amount of the at least one plant-derived protein plus the aleuritic acid.

14. Cellulose-based composite material according to claim 1, wherein the at least one plant-derived protein is present in the dissolving solution in an amount of 55% of a total amount of the at least one plant-derived protein plus the aleuritic acid.

15. Cellulose-based composite material according to claim 1, wherein said at least one plant-derived protein is zein.

16. Cellulose-based composite material according to claim 1, wherein the aleuritic acid is present in the dissolving solution in an amount comprised between 40 and 50% of a total amount of the at least one plant-derived protein plus the aleuritic acid.

17. Cellulose-based composite material according to claim 1, wherein the aleuritic acid is present in the dissolving solution in an amount of 45% of a total amount of the at least one plant-derived protein plus the aleuritic acid.

18. Cellulose-based composite material according to claim 1, wherein said electrically conductive material is dispersed in said dissolving solution in an amount comprised between 30 and 40% of a total amount of the at least one plant-derived protein plus the aleuritic acid in order to achieve said conductive ink.

19. Cellulose-based composite material according to claim 1, wherein said electrically conductive material is dispersed in said dissolving solution in an amount of 30% of a total amount of the at least one plant-derived protein plus the aleuritic acid in order to achieve a conductive ink.

20. Cellulose-based composite material according to claim 1, wherein the cellulose substrate has a thickness comprised between 30 and 70 μm.

21. Cellulose-based composite material according to claim 1, wherein said hot-pressing is carried out at a temperature of 190° C.

22. Cellulose-based composite material according to claim 1, wherein said hot-pressing is carried out at a pressure comprised between 10 and 20 bar.

23. Cellulose-based composite material according to claim 1, wherein said hot-pressing is carried out at a pressure of 20 bar.

24. Cellulose-based composite material according to claim 1, wherein the dissolving solution comprises methanol and chloroform in a volume ratio (v/v) of 1:1.

25. Cellulose-based composite material comprising a cellulose substrate impregnated with an electrically conductive material dispersed in a matrix containing at zein and polyaleuritate.

\* \* \* \* \*